United States Patent [19]
Brower et al.

[11] Patent Number: 5,557,065
[45] Date of Patent: Sep. 17, 1996

[54] OVERVOLTAGE PROTECTORS SEALED WITH GEL

[75] Inventors: Boyd G. Brower; Robert A. Crane, both of Keller; John J. Napiorkowski, Irving; William J. Shannon, North Richland Hills, all of Tex.

[73] Assignee: Siecor Corporation, Hickory, N.C.

[21] Appl. No.: 342,986

[22] Filed: Nov. 21, 1994

[51] Int. Cl.⁶ .................................................. H05K 5/06
[52] U.S. Cl. .......................................... 174/52.3; 361/119
[58] Field of Search ................................ 361/119, 121, 361/58, 124–127, 58; 439/272, 279, 922, 936; 174/2, 50.51, 52.3, 76, 77 R, 5 R

[56] References Cited

U.S. PATENT DOCUMENTS

| | | | |
|---|---|---|---|
| 4,212,047 | 7/1980 | Napiorkowski | 361/124 |
| 4,600,261 | 7/1986 | Debbaut | 339/116 |
| 4,634,207 | 1/1987 | Debbaut | 339/116 |
| 4,741,709 | 5/1988 | Jervis | 439/521 |
| 4,824,390 | 4/1989 | Crane et al. | 439/271 |
| 4,846,721 | 7/1989 | Debruycker et al. | 439/411 |
| 4,958,254 | 9/1990 | Kidd et al. | 361/119 |
| 5,102,347 | 4/1992 | Cote et al. | 439/412 |
| 5,140,746 | 8/1992 | Debbaut | 29/855 |
| 5,195,125 | 3/1993 | Bliven et al. | 379/29 |
| 5,359,654 | 10/1994 | Jensen et al. | 379/397 |
| 5,388,023 | 2/1995 | Boy et al. | 361/129 |

Primary Examiner—Jeffrey A. Gaffin
Assistant Examiner—Michael J. Sherry
Attorney, Agent, or Firm—Wesley T. Noah

[57] ABSTRACT

Telecommunications overvoltage protectors are sealed from environmental degradation by a gel. The gel is inserted in such a way as not to interfere with moving parts or air gaps in the protectors.

4 Claims, 4 Drawing Sheets

5,557,065

OVERVOLTAGE PROTECTORS SEALED WITH GEL

BACKGROUND OF THE INVENTION

Overvoltage protectors are widely used for the protection of equipment from overvoltage conditions which may be caused by lightning, contact with high voltage lines, or miscellaneous transient conditions.

One type of overvoltage protector is a five pin protector module for telephone circuits; an example is disclosed in Kidd et al., U.S. Pat. No. 4,958,254.

Another type of overvoltage protector is a gas tube type. An environmentally protected gas tube overvoltage protector is disclosed in Napiorkowski, U.S. Pat. No. 4,212,047. Napiorkowski's gas tube protector is potted in an epoxy potting compound. Because the potting compound may interfere with the air gap or the short circuiting clip in Napiorkowski's gas tube protector, the assembly is wrapped and voids filled with PTFE or equivalent material prior to the potting.

Napirokowski's epoxy potting compound is not entirely satisfactory, however, due to the fact that potting compound expands differently from the surrounding enclosure during changes in temperature, over time causing cracks to appear in the potting compound which lessen its environmental protection of the protector.

Two gas tube type station protectors having a base opening and two upstanding line terminals projecting through terminal openings are the TII 355 and the AT&T 325EW. The TII 355 station protector module employs environmental protection by potting the entire base opening area and its two line terminal openings. The AT&T 325EW station protector employs an O-ring for its two line terminal openings.

Gels are used in other types of prior art electrical devices. See, for example, gel sealed apparatus as disclosed in U.S. Pat. Nos. 4,212,047; 4,600,261; 4,634,207; 4,741,709; 4,824,390; 4,846,721; 5,102,347; 5,140,746; and 5,195,125.

In order to perform their intended function, overvoltage protectors, however, must be capable of changing from a first state, allowing normal current to proceed through the protector, to a second state during overvoltage conditions, usually causing a short circuit to protect electrical components from excessive voltage and resultant damage. The protectors may change to the second state by the operation of coil, cantilever, or other type springs which urge a grounded component of some type through an air gap into contact with a component in electrical connection with the normal circuit. It is clear that the preservation of air gaps and operability of the moving parts is critical to the intended operation of these protectors. Perhaps for this reason, the prior art has apparently not provided gel-sealed overvoltage protectors.

SUMMARY OF THE INVENTION

An object of the invention is to overcome the shortcomings in the prior art by providing overvoltage protectors environmentally sealed with gel. Solid-state protectors have been found to work reliably even when their spring urging a component into a grounded condition is coated with a gel. For the spring to retain its function, the gel viscosity is chosen so as to not interfere with spring movement during overvoltage conditions. An effective method for evenly coating the protector components has been found to be dipping the components in the gel, although other application methods can be used. After the components are coated, the components are oriented such that the gel flows toward a cover opening to be sealed without the need of a further coating operation for sealing the cover opening.

Other types of protectors, such as some gas tube-type protectors, have been found to have arrestors which are sensitive to afford reliable operation in the presence of gel. For such protectors, the gel is inserted only at housing openings in such a way as the gel does not intermingle with sensitive arrestor components.

In either case, the result of the invention is an overvoltage protector which reliably performs its intended function while having the advantage of gel sealing.

BRIEF DESCRIPTION OF THE DRAWINGS

Figure 1:
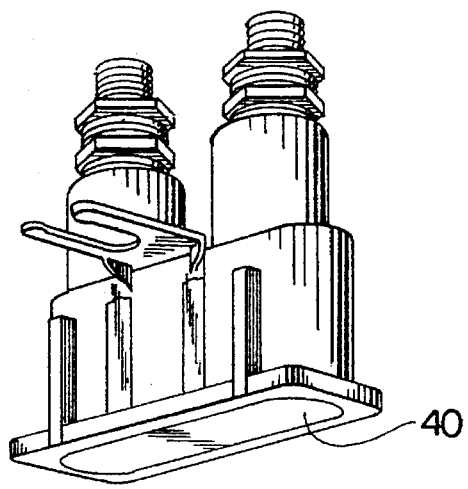
FIG. 1 is a view of a prior art potted station protector.
Figure 2:
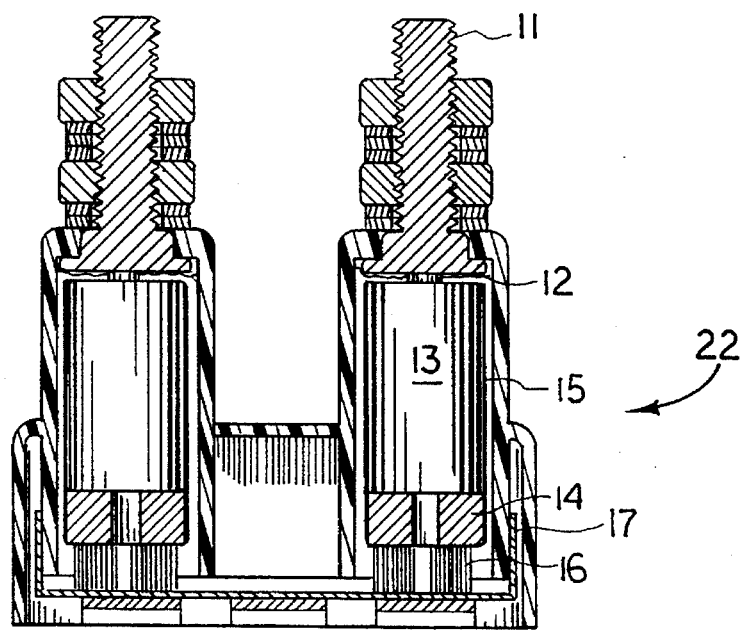
FIG. 2 is a cut-away view of a gas tube protector according to the invention.
Figure 3:
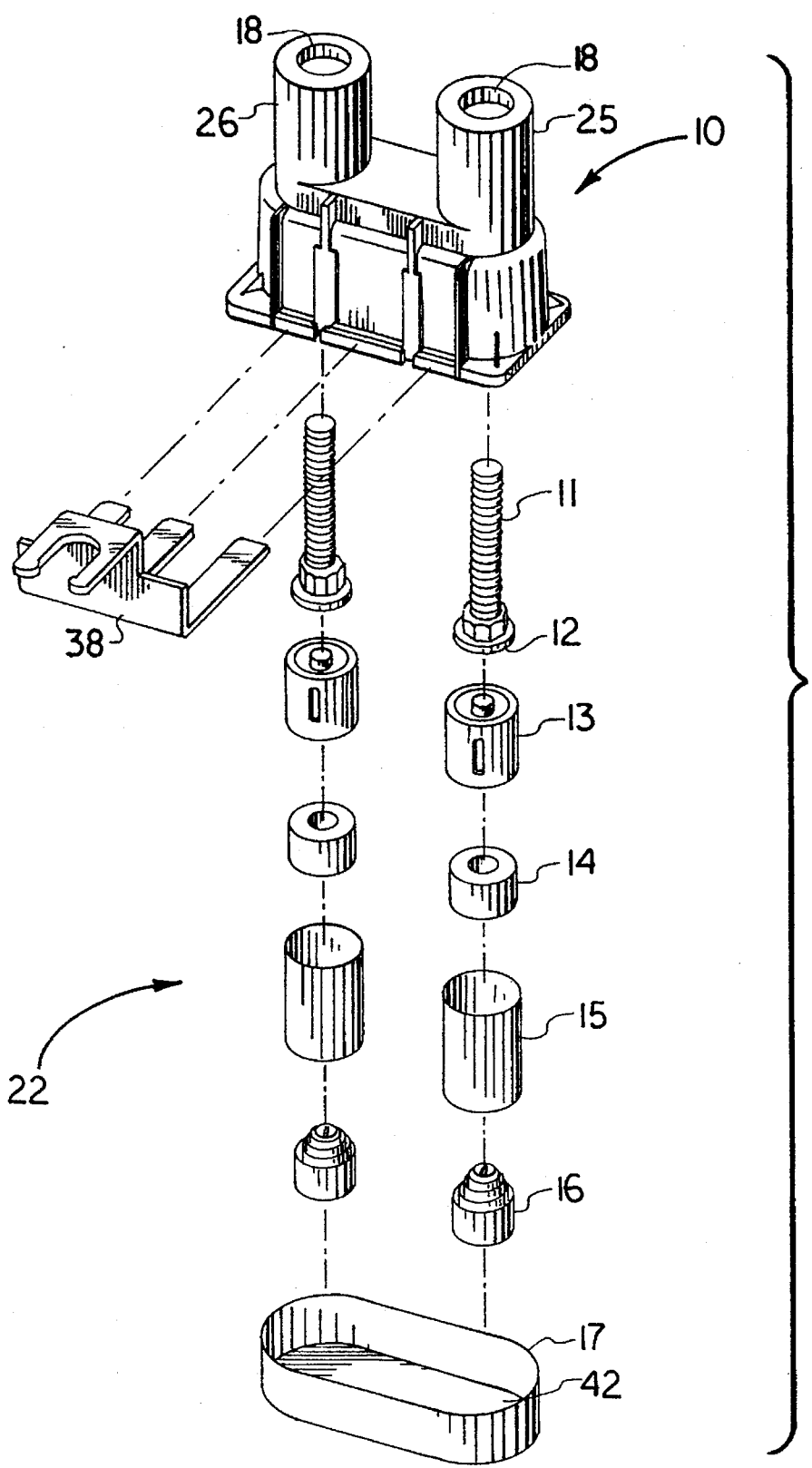
FIG. 3 is an exploded view of the protector of FIG. 2.
Figure 4:
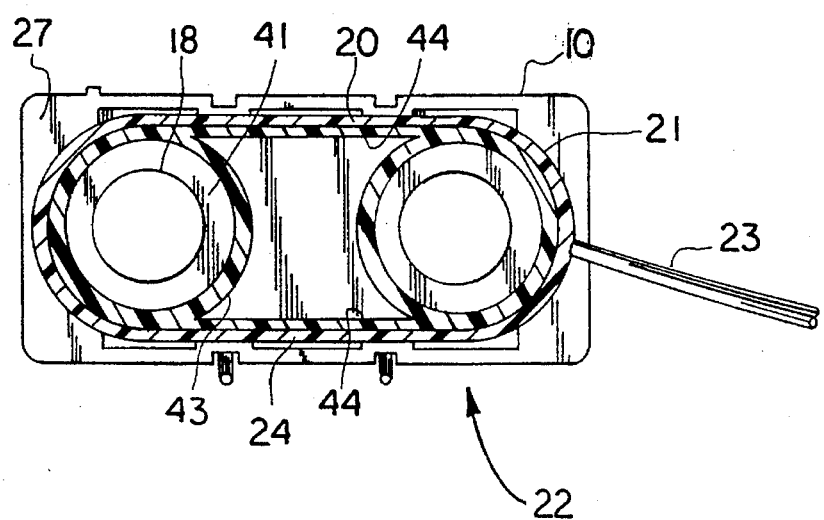
FIG. 4 is a bottom view of the housing of the protector of FIG. 2.

A prior art potted gas tube-type station protector, shown in FIG. 1, includes a housing having a base opening completely potted with a potting compound 40. The potting compound is likewise used to seal its housing line terminal apertures. An improved gas tube-type station protector 22 according to the invention is shown in a partially cut away view in FIG. 2 and in an exploded view in FIG. 3. Protector 22 includes a housing 10 made generally according to the prior art. Housing 10 includes line terminal posts 25, 26 having apertures 18 therein. The heads of terminal screws 11 are coated on both their upper and lower sides with a gel 12 and inserted through housing base opening 21 and the housing interior so that they protrude through apertures 18, with the gel-coated heads of screws 11 force-fitting against the interior of posts 25,26 to be snug against interior post surfaces 41 adjacent apertures 18, gel 12 thereby sealing against surfaces 41 to seal apertures 18. Gas tube arrestors 13 are placed against screws 11, and pellets 14, which are designed to melt during predetermined overvoltage situations, are placed against arrestors 13. Electrically conductive cans 15 each contain an arrestor 13 and a pellet 14, but do not touch screws 11 during normal operating conditions. Copper springs 16 are seated between the bottoms of cans 15 and an electrically conductive base covering cap 42 having a seating flange 17. Cap 42 is grounded by clip 38. During predetermined overvoltage conditions, pellets 14 are adapted to melt, allowing springs 16 to push cans 15 against the heads of line terminal screws 11, shorting the line circuit to ground. As seen in FIG. 4, base 27 of housing 10 includes a base aperture 21 through which terminal apertures 18 and the bases 43 of posts 25,26 are visible. The outer portions of post bases 43 and walls 44 together with the housing interior surface delimit a slot 20 in base 27 in which flange 17 of base closing cap 42 is seated. Gel 24 is inserted by needle into slot 20 before flange 17 is inserted to seal the base opening, but gel 24 is not inserted generally through base aperture 21, and in particular is not inserted into the interior of posts 25,26 to avoid coating arrestors 13.

Figure 5:
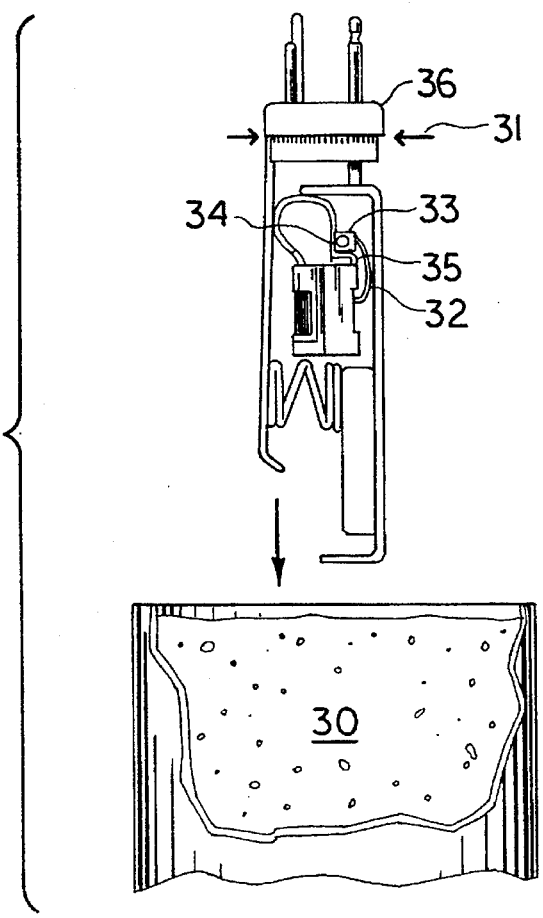
FIG. 5 is a side elevation of a solid state protector according to the invention during the gel coating process.
Figure 6:
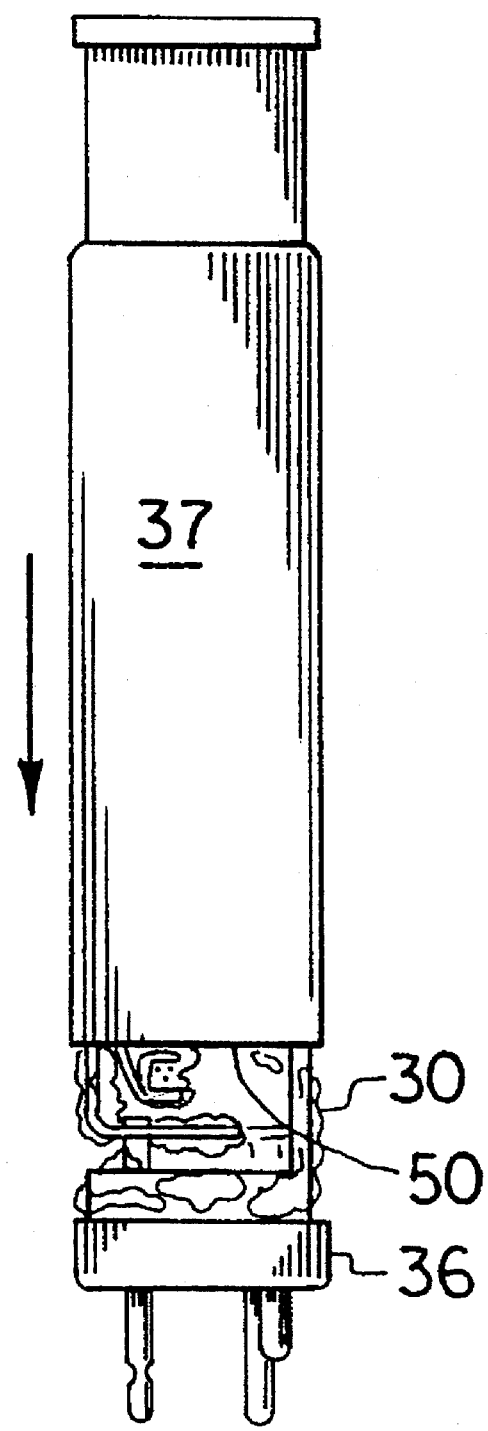
FIG. 6 is a side elevation of the protector of FIG. 5 during cover assembly.

The solid-state five pin protector of FIGS. 5, 6 can be internally gel-coated, and is dipped into gel 30 contained in a reservoir. Details of the prior art Sylvania 6EPE protector can be seen in U.S. Pat. No. 5,191,605, incorporated herein by reference. The protector includes a pellet 34 held by shorting bar 33. During predetermined overvoltage conditions, pellet 34 melts, allowing cantilever spring 32 to impel shorting bar 33 against switch terminals 35, thereby grounding the terminals seated in base 36. The dip depth is indicated at 31, about midway through the depth of base 36. The assembly is then dipped into gel 30 as indicated in FIG. 5. After dipping, the now gel-coated protector, with cover 37 assembled therewith, is oriented to allow gravity to urge gel 30 toward opening 50 of cover 37, which fits around base 36, thereby gel sealing opening 50. Gel 30 is subsequently cured. The gel penetration value is selected not to interfere with reliable operation of the protector given the spring constant of the spring; a cured gel penetration value of 6.0 mm at 25 degrees C. has been found to be suitable for continued normal operation of prior art spring 32 exerting a force of 2.9 to 3.5 pounds, averaging 3.2 pounds. Gel 30, also suitable for use in the gas-tube type protector embodiment, has a specific gravity of 0.98 when uncured, a dielectric constant at 1000 Hz of 2.8 when cured, and sets up in around 30 minutes after mixing.

What is claimed is:

1. A protector sealed with gel, comprising:
   (a) a housing defining an interior surface, an open base with a perimeter, and a slot about the perimeter of the open base;
   (b) an arrestor mounted in the housing;
   (c) a first sealing gel applied in the slot; and
   (d) a base closing cap having a flange slidably received in the slot and into the gel.

2. The protector of claim 1 wherein the housing further defines a pair of apertures and the protector further comprises a pair of terminal screws, each screw having a head, the heads disposed inside the housing with the pair of screws extending through the pair of apertures to outside the housing, the heads larger than the apertures and disposed against the interior surface of the housing, the protector further comprising a second gel applied between the heads and the interior surface of the housing against which the heads are disposed.

3. A method of sealing a protector that has a base with protector elements mounted to the base and a cover that fits over the protector assembly and engages part of the base to enclose the protector elements, the method comprising the steps of:
   (a) with the cover removed, applying gel to the part of the base to be engaged by the cover;
   (b) mounting the protector elements to the base; and
   (c) sliding the cover over the protector assembly and into engagement with the base.

4. The method of claim 3 wherein the protector elements are first installed to the base and the step of applying gel further comprises dipping the protector elements downwardly into the gel until the gel coats the protector elements and the part of the base to be engaged by the cover, the method further comprising removing the protector elements from the gel before sliding the cover over the protector elements and into engagement with the base.

* * * * *